(12) United States Patent
Li et al.

(10) Patent No.: US 11,427,948 B2
(45) Date of Patent: Aug. 30, 2022

(54) SEALING VALVE INSTALLATION STRUCTURE AND CLEANING-FREE WASHING MACHINE

(71) Applicants: QINGDAO HAIER WASHING MACHINE CO., LTD., Shandong (CN); QINGDAO HAIER SMART TECHNOLOGY R&D CO., LTD., Shandong (CN); HAIER SMART HOME CO., LTD., Shandong (CN)

(72) Inventors: Yimin Li, Shandong (CN); Chunfeng Lao, Shandong (CN); Xinghui Hao, Shandong (CN); Di Wu, Shandong (CN); Peishi Lv, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN); HAIER SMART HOME CO., LTD., Shandong (CN)

(*) Notice: Subject to any disclaimer, the term of this patent is extended or adjusted under 35 U.S.C. 154(b) by 0 days.

(21) Appl. No.: 16/976,039

(22) PCT Filed: Feb. 21, 2019

(86) PCT No.: PCT/CN2019/075734
§ 371 (c)(1),
(2) Date: Aug. 26, 2020

(87) PCT Pub. No.: WO2019/165923
PCT Pub. Date: Sep. 6, 2019

(65) Prior Publication Data
US 2020/0399814 A1    Dec. 24, 2020

(30) Foreign Application Priority Data
Feb. 27, 2018  (CN) .................. CN201810163974.X

(51) Int. Cl.
*D06F 37/06* (2006.01)
*D06F 23/02* (2006.01)
(Continued)

(52) U.S. Cl.
CPC .......... *D06F 37/065* (2013.01); *D06F 23/025* (2013.01); *D06F 37/06* (2013.01);
(Continued)

(58) Field of Classification Search
CPC .......... D06F 21/02; D06F 21/04; D06F 21/10; D06F 23/02; D06F 23/025; D06F 23/06;
(Continued)

(56) References Cited

U.S. PATENT DOCUMENTS 9,127,393 B2    9/2015  Gomez Caudevilla et al.
2011/0232698 A1  9/2011  Gomez et al.

FOREIGN PATENT DOCUMENTS

CN    205856858 U    1/2017
CN    106436194 A    2/2017
(Continued)

OTHER PUBLICATIONS

International Search Report (PCT/ISA/210) dated May 16, 2019, by the Chinese Patent Office as the International Searching Authority for International Application No. PCT/CN2019/075734.
(Continued)

*Primary Examiner* — David G Cormier
(74) *Attorney, Agent, or Firm* — Buchanan Ingersoll & Rooney PC

(57) ABSTRACT

A support plate mounted on the inner side wall of an inner drum has a through hole corresponding to drain openings formed in the wall of the drum, and a gap between the support plate and the side wall of the inner drum forms a space for valve plugs of sealing valves to move up and down; a mounting sleeve installed on the upper side of the
(Continued)

support plate has an inner through hole coaxially arranged with the through hole in the support plate, so that the valve plugs of the sealing valves are coaxially installed in the inner through hole and can move up and down. A drain opening formed in the side wall of the inner drum is provided with a sealing valve installed on the inner drum via the sealing valve structure.

15 Claims, 5 Drawing Sheets

(51) Int. Cl.
*D06F 39/08* (2006.01)
*F16K 27/02* (2006.01)
*F16K 31/52* (2006.01)

(52) U.S. Cl.
CPC ............ *D06F 39/083* (2013.01); *F16K 27/02* (2013.01); *F16K 31/52* (2013.01)

(58) Field of Classification Search
CPC ........ D06F 23/065; D06F 33/40; D06F 33/42; D06F 33/47; D06F 33/60; D06F 33/62; D06F 33/74; D06F 34/00; D06F 34/04–34; D06F 35/007; D06F 37/02; D06F 37/04; D06F 37/06; D06F 37/065; D06F 37/08; D06F 37/10; D06F 37/302; D06F 39/08; D06F 39/083; D06F 2101/00–20; D06F 2103/00–70; D06F 2105/50; D06F 2105/52–62; B04B 1/16; F16K 1/38

See application file for complete search history.

(56) References Cited

FOREIGN PATENT DOCUMENTS

| | | | |
|---|---|---|---|
| CN | 205934467 U | 2/2017 | |
| CN | 206015329 U | 3/2017 | |
| CN | 106811910 A | 6/2017 | |
| CN | 107523969 A | 12/2017 | |
| CN | 107630333 A | 1/2018 | |
| CN | 107687071 A | 2/2018 | |
| GB | 2432593 A * | 5/2007 | ............ D06F 37/02 |
| WO | 0204734 A1 | 1/2002 | |

OTHER PUBLICATIONS

Written Opinion (PCT/ISA/237) dated May 16, 2019, by the Chinese Patent Office as the International Searching Authority for International Application No. PCT/CN2019/075734.

EP Extended Search Report received in corresponding Application No. 19759938.4 dated Mar. 9, 2021 (7 pages).

* cited by examiner

SEALING VALVE INSTALLATION STRUCTURE AND CLEANING-FREE WASHING MACHINE

TECHNICAL FIELD

The present disclosure belongs to the technical field of washing machines, and in particular, relates to a washing machine with only a rotatable and water holding inner drum and to a sealing valve installation structure being configured to the washing machine.

BACKGROUND

In the prior art, a drum washing machine generally includes an inner drum and an outer drum which are sleeved mutually, wherein the outer drum is sealed to accommodate water, and the inner drum is configured to accommodate clothes and beat and wash clothes via rotation of the inner drum. Meanwhile, the inner drum is provided with water dehydrating holes, such that water in the outer drum flows into the inner drum through the water dehydrating holes to soak clothes in the inner drum, water in the inner drum flows to the outer drum through the water dehydrating holes, and moisture on the clothes in the inner drum is discharged out to the outer drum through the water dehydrating holes when the inner drum rotates at a high speed, to realize the purpose of washing clothes.

However, since the inner drum and the outer drum are sleeved mutually, in the using process of the washing machine, dirt easily accumulates between the inner drum and the outer drum. Meanwhile, since the inner drum and the outer drum are sleeved mutually, users cannot clean an outer wall of the inner drum and an inner wall of the outer drum, such that bacteria inside the washing machine increase, thereby lowering washing efficiency of the washing machine and lowering cleanliness of clothes after washing.

Meanwhile, in the above existing washing machine, since an outer side of the inner drum is sleeved with the outer drum, as to the washing process of the washing machine, clothes are beaten and washed via rotation of the inner drum, such that the washing capacity of the washing machine is based on the inner drum, an internal space of the washing machine is low in using efficiency, and the washing capacity of the washing machine cannot be expanded on the existing basis.

In view of this, it has become a research hotspot of how to set a washing machine to integrate the inner drum with the outer drum or directly set a closed inner drum, such that the inner drum is set to be a closed container, then the inner drum can accommodate water and clothes and can also rotate to beat clothes for washing, and also the problem that the space between the inner drum and the outer drum needs to be cleaned since washing water flows between the inner drum and the outer drum is further avoided. Meanwhile, since no outer drum is arranged in the washing machine, or the outer drum is integrated with the housing of the washing machine, the inner drum of the washing machine can be further enlarged, to expand the washing capacity of the washing machine.

However, since the inner drum can be not only configured to accommodate washing water, but also can rotate to beat and clean clothes in the drum, therefore, how to set a water dehydrating structure and a water drainage structure applicable to the above washing machine has become a problem to be urgently solved.

In view of the above technical shortcomings, the present disclosure is hereby provided.

SUMMARY

An objective of the present disclosure is to provide a washing machine to overcome the above shortcomings in the prior art. A sealing valve structure is also disclosed to achieve the purpose of fixing the sealing valve to the side wall of the inner drum of the washing machine corresponding draining opening In order to solve the technical problem and achieve the technical effect, a basic design idea of the technical solution adopted by the present disclosure is as follows.

A sealing valve installation structure includes a support plate mounted on the inner side wall of an inner drum. A through hole corresponding to drain openings formed in the side wall of the inner drum is provided in the middle of the support plate, and a certain gap between the support plate and the side wall of the inner drum is provided to form a space for valve plugs of sealing valves to move up and down. A sleeve-shaped mounting sleeve is fixedly installed on the upper side of the support plate. An inner through hole of the mounting sleeve and the through hole formed in the support plate are coaxially and oppositely arranged, so that the valve plugs of the sealing valves are coaxially installed in the inner through hole and can move up and down.

Further, at least one lifting rib is installed on the side wall of the inner drum of the washing machine, and a lifting rib body is of a shell structure whose lower side is open and that is fastened to the inner side wall of the inner drum. The rib lifting body is hollow inside to form a mounting cavity for installation of the sealing valve, and the sealing valve installation structure is arranged in the mounting cavity.

Further, the support plate is a plate that is laid flat on the inner wall of the drum, the lower side of the support plate is provided with multiple support ribs protruding and extending downward, and the lower ends of the supporting ribs are in limit contact with the inner side wall of the inner drum. Preferably, the outer periphery of the supporting plate is provided with multiple supporting ribs arranged at intervals. Further preferably, the left and right sides of the supporting plate are provided with multiple supporting ribs arranged at interval, and the front and rear sides of the supporting plate are respectively provided with a whole supporting rib extending along the corresponding side.

Further, the left and right sides of the lifting rib are respectively provided with notches, and the notches are formed corresponding to the sides of the support plate, so that the sides of the support plate are clamped in the notches on the corresponding sides.

Further, the support plate is provided with a downwardly recessed positioning groove and a jack that is arranged in a penetration manner. The jack vertically penetrates through the support plate, and the lower side of the lifting rib is provided with a first mounting rib that protrudes and extends downward and that is coaxially arranged with the jack. The lower end of the first mounting rib is provided with a bolt hole coaxially opposite to the jack. A bolt sequentially passes through the inner drum wall and the support plate from the outer wall of the drum upwards, and then is correspondingly screwed and fixed to the bolt hole formed in the first mounting rib, so that the support plate and the lifting rib are fixedly installed with the inner drum. The positioning groove is formed in the upper side surface of the support plate, the lower side of the lifting rib is provided with a second mounting rib protruding and extending downward and coaxially arranged corresponding to the positioning groove, and the lower end of the second mounting rib is provided with a positioning pin that is correspondingly in plug-connection to the positioning groove.

Further, the mounting sleeve is of a tube structure vertically extending. The lower end of the mounting sleeve is open, the upper end of the mounting sleeve is provided with a folding edge protruding horizontally inward, and an inner periphery of the folding edge is provided with an inner peripheral folding edge vertically extending downward to the lower end of the mounting sleeve. An outer wall of the inner peripheral folding edge and an inner wall of the folding edge are separated by a certain gap, to form a chamber for the installation of a reset spring of the sealing valve. Preferably, the lower end of the mounting sleeve is placed on the upper side of the support plate, the mounting sleeve is coaxially arranged with the through hole formed in the support plate, an inner peripheral diameter of the lower end of the mounting sleeve is less than or equal to the diameter of the through hole, and an outer peripheral diameter of the lower end of the mounting sleeve is greater than the diameter of the through hole.

Further, the upper side of the support plate is provided with a mounting rib protruding and extending upward, and the upper end of the sealing sleeve is provided with extending ribs horizontally protruding and extending outward. The extending end of the extending rib and the upper end of the mounting rib is correspondingly overlapped and fitted, and overlapping parts are fixed and connected by the bolts, so that the support plate and the mounting sleeve are fastened to be installed by the bolts. Preferably, mounting ribs respectively arranged on the left and right sides of the through hole are arranged on the upper side of the support plate, and the extending ribs horizontally protruding and extending outward are respectively provided on the left and right sides of the mounting sleeve, so that the two extending ribs and the mounting ribs on the corresponding sides respectively overlap and are fixed to be installed by the bolts.

Further, one side of the mounting sleeve is provided with a second extending rib that horizontally protrudes and extends outward, and the extending end of the second extending rib is provided with a hinge hole having a horizontal axis, to implement hinged installation of the counterweight of the sealing valve. Preferably, an included angle between the second extending rib and the extending direction of the extending rib is 90 degrees, and the axis of the hinge hole is parallel to the extending direction of the extending rib. Further preferably, the extending end of the second extending rib is higher than the top of the mounting sleeve, and the extending end of the second extending rib is provided with a slot, the slot is formed along the extending direction of the second extending rib, to implement corresponding plug-connection to the counterweight of each sealing valve. The slot is provided with a horizontally extending hinge hole.

Further, the mounting cavity enclosed by the lifting rib is provided with two correspondingly arranged sealing valve mounting structures, and the second extending ribs of the two sealing valve mounting structures oppositely extend in an approaching direction.

In the present disclosure, a cleaning-free washing machine is disclosed. An inner drum of the washing machine is a sealed container after a drum opening is fastened and sealed by a door cover. A side wall of the inner drum is provided with at least one lifting rib. The lifting rib is hollow and communicate to the inside of the inner drum. At least one drain opening communicated to a hollow part of the lifting rib is formed in the side wall of the inner drum. The drain opening is provided with a sealing valve inside the lifting rib. The sealing valve is installed on the inner drum via the sealing valve structure mentioned above. When the inner drum rotates at a high speed, the valve plug of the sealing valve moves along a radial center direction of the inner drum under the action of centrifugal force to open the drain opening formed in the side wall of the inner drum.

Compared with the washing machine in the prior art, the washing machine of the present disclosure has the following beneficial effects.

Through the above arrangement, the drain opening is hidden inside the lifting rib of the inner drum, and water in the inner drum is drained out from the hidden drain opening. And A sealing valve is installed at the drain opening, so that a valve plug of the sealing valve is correspondingly controlled by using a centrifugal force when the drum rotates at a high speed to correspondingly open and close the drain opening. When the washing machine performs the dehydration and/or drainage process, after the centrifugal force under the high-speed rotation of the inner drum acts on the valve plug of the sealing valve, the drain opening automatically opens and the inner drum performs corresponding drainage.

The above installation structure is arranged on the inner drum, the valve plugs of the sealing valves arranged at the drain openings can be correspondingly assembled in the gap between the support plate and the inner drum, so that the valve plugs have an upper and lower movement margin in the gap, and it is ensured that the valve plugs correspondingly block or open the drain openings. At the same time, valve plug columns are correspondingly assembled in the mounting sleeves to be limited in the movement direction by the mounting sleeves, thereby avoiding tilting of the valve plug columns. In addition, the mounting sleeves are arranged on the support plate, and supporting points of counterweights of the sealing valves can be correspondingly mounted at the outer peripheries of the mounting sleeves. In this way, prying rotation and installation fixation of the counterweights are ensured.

The structure of the present disclosure has a simple structure and significant effects, and is suitable for popularization and use.

In order to make the design concept of the technical solution of the present disclosure clearer and facilitate further understanding of the beneficial effects brought about by the technical solution, some specific implementations of the present disclosure are described in detail below with reference to the accompanying drawings.

BRIEF DESCRIPTION OF THE DRAWINGS

The accompanying drawings are used as a part of the present disclosure to further explain the present disclosure. The illustrative embodiments and descriptions of the present disclosure are used to explain the present disclosure, but do not constitute an improper limitation on the present disclosure. Obviously, the accompanying drawings in the following description are only some embodiments. For those skilled in the art, other drawings can be obtained according to these drawings without paying creative work. In the drawings.

Figure 1:
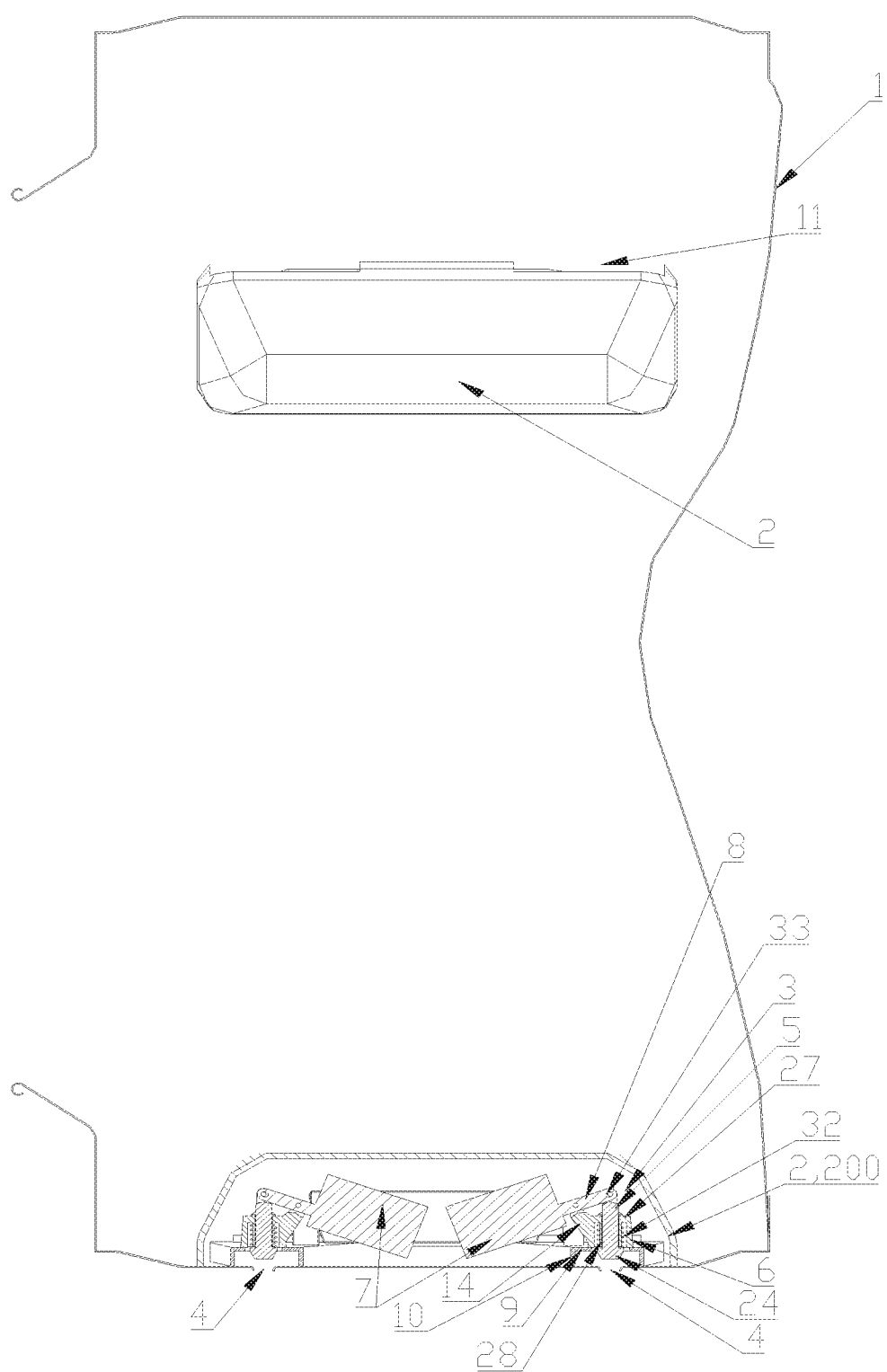
FIG. 1 is a schematic structural diagram of an inner drum of a washing machine according to an embodiment of the present disclosure.

Reference signs in the drawings: 1—inner drum, 2—lifting rib, 3—mounting cavity, 4—drain opening, 5—valve plug column, 6—mounting sleeve, 7—counterweight, 8—connecting rib, 9—support plate, 10—support rib, 11—notch, 12—water penetration hole, 13—slot, 14—second extending rib, 15—first mounting rib, 16—second mounting rib, 17—bolt, 18—positioning pin, 19—bolt hole, 20—fixing rib, 21—claw, 22—limiting rib, 23—through hole, 24—valve plug, 25—jack, 26—positioning groove, 27—folding edge, 28—inner peripheral folding edge, 29—mounting rib, 30—extending rib, 31—hinge hole, 32—reset spring, 33—long-strip-shaped through hole, 200—lifting rib body.

It should be noted that these drawings and text descriptions are not intended to limit the scope of the conception the present disclosure in any way, but to explain the concept of the present disclosure for those skilled in the art by referring to specific embodiments.

DETAILED DESCRIPTION

In order to make the objectives, technical solutions and advantages of the embodiments of the present disclosure clearer, the technical solutions in the embodiments are described clearly and completely with reference to the accompanying drawings in the embodiments of the present disclosure. The following embodiments are used to illustrate the present disclosure, but not used to limit the scope of the present disclosure.

In the description of the present disclosure, it should be noted that orientation or positional relationships indicated by the terms "upper", "lower", "front", "rear", "left", "right", "vertical", "inner", "outer", etc., are orientation or positional relationships shown in the drawings, and are only for the convenience of describing the present disclosure and simplifying the description, and it is not indicated or implied that the indicated device or element has a specific orientation or is structured or operated in a specific orientation, and therefore this cannot be understood as a limitation of the present disclosure.

In the description of the present disclosure, it should be noted that the terms "install", "connected" and "connection" should be understood in a broad sense unless otherwise clearly specified and limited, for example, may be a fixed connection, or may be a detachable connection, or may be an integrated connection; may be a mechanical connection, or may be an electrical connection; may be a direct connection or an indirect connection by using an intermediate medium. For those skilled in the art, the specific meaning of the above terms in the present disclosure can be understood in specific situations.

As shown in FIG. 1-FIG. 7, embodiments of the present disclosure introduce a washing machine. The washing machine includes a housing, an inner drum 1 is arranged in the housing, and an axis of the inner drum 1 extends horizontally or gradually inclines downward from front to rear. A front end of the inner drum 1 is provided with a drum opening that is arranged in an open manner, and a rear end of the inner drum 1 is provided with a bottom of the inner drum that is arranged in a sealed manner. There is no through hole in a drum wall of the inner drum 1, so that the inner drum 1 forms a sealed container with which only an opening is formed in the front end. At the same time, a door cover that can be opened outward is installed at a front end of the housing of the washing machine, to seal the drum opening after the door cover is closed, and to put clothes into the inner drum 1 through the drum opening after the door cover is opened. The rear end of the inner drum 1 is installed in the housing of the washing machine via an inner drum support. The inner drum support is coaxially arranged with the rear end of the inner drum 1. An upper end and a lower end of the inner drum support are respectively bent toward a direction of the drum opening on the front end of the inner drum 1. Bending portions, which are formed by the upper end and the lower end of the inner drum support being bent toward the drum opening respectively, extend at least to a middle of the inner drum 1. An upper bending portion and a lower bending portion are respectively connected to the housing of the washing machine via a damping hanging spring and a damping support rod to achieve an objective that the inner drum support can be installed in the housing of the washing machine in a vibrating manner. At the same time, a center of the bottom of the inner drum is coaxially arranged with a motor shaft of a drive motor of the washing machine, to drive the inner drum 1 to rotate, and the inner drum 1 and the drive motor are both fixedly installed on the inner drum support. Preferably, the bottom of the inner drum and the drive motor are respectively arranged on two sides of the inner drum support, the drive motor is fixedly connected to the inner drum support, the motor shaft of the drive motor passes through the inner drum support via a bearing and is coaxially fixedly connected to the bottom of the inner drum, and the motor shaft of the drive motor can rotate relative to the inner drum support, to achieve an objective that the inner drum 1 and the drive motor are mounted on the inner drum support, and the inner drum 1 can rotate independently under an action of the drive motor to wash clothes in the inner drum.

In addition, the washing machine in the embodiments of the present disclosure can be any washing machine in the prior art that an inner drum forms a sealed container after a door cover closes an inner drum opening. When the washing machine executes a dehydration process, the inner drum is controlled to rotate at a high speed, and the water flow separated from the clothes in the inner drum is smoothly drained from the inner drum, so as to achieve an objective of normally executing the dehydration process for a holeless drum washing machine. Therefore, the washing machine in the embodiments of the present disclosure is not limited to the structure in the drawings. For example, an existing ordinary washing machine may further be used provided that the inner drum 1 of the washing machine is arranged without dehydration holes, and a sealed container is formed after the door cover closes the drum opening. At the same time, the washing machine in the embodiments of the present disclosure can further be applicable to a top-opening washing machine. A clothes delivery opening is formed in the side wall of the inner drum, and a door body that can be turned outwards to be opened and closed so as to correspondingly seal and unseal the clothes delivery opening can be arranged on the side wall of the inner drum. After the inner drum stops rotating, the inner drum is positioned at a corresponding position, so that a user can correspondingly open the door body, and put the clothes into or take the clothes out of the inner drum of the washing machine through the clothes delivery opening.

At the same time, the inner drum is disposed as the sealed container for washing after the door cover is closed, so that the clothes only come into contact with the washing water in the sealed inner drum during washing. In this way, a case in which the clothes are contaminated because the washing water between the drum and the outer drum flows into the inner drum is prevented, washing cleanliness of the washing machine is greatly improved, and incomplete washing of the clothes caused by contamination of the washing water between the inner drum and the outer drum is avoided.

In the embodiment, a cleaning-free washing machine is disclosed. An inner drum 1 of the washing machine is a sealed container after a drum opening is fastened and sealed by a door cover. A side wall of the inner drum 1 is provided with lifting ribs 2. The lifting ribs 2 are hollow and communicate to the inside of the inner drum 1. At least one drain opening 4 communicated to a hollow part of the lifting rib 2 is formed in the side wall of the inner drum 1. The drain opening 4 is provided with a sealing valve inside the lifting rib 2. When the inner drum 1 rotates at a high speed, a valve plug 24 of the sealing valve moves along a radial center direction of the inner drum 1 under the action of centrifugal force to open the drain opening 4 formed in the side wall of the inner drum 1.

Through the above arrangement, the drain opening is hidden inside the lifting rib of the inner drum, and water in the inner drum is drained out from the hidden drain opening. And A sealing valve is installed at the drain opening, so that a valve plug of the sealing valve is correspondingly controlled by using a centrifugal force when the drum rotates at a high speed to correspondingly open and close the drain opening. When the washing machine performs the dehydration and/or drainage process, after the centrifugal force under the high-speed rotation of the inner drum acts on the valve plug of the sealing valve, the drain opening automatically opens and the inner drum performs corresponding drainage.

Embodiment 1

As shown in FIG. 1 to FIG. 5, this embodiment discloses a structure of a lifting rib of an inner drum for the above cleaning-free washing machine. The lifting rib 2 of the inner drum includes a lifting rib body 200 extending along structural lines of a side wall of the inner drum, and the body is of a shell structure whose lower side is open and that is fastened to the inner side wall of the inner drum 1. The lifting rib body 200 is hollow inside to form a mounting cavity 3 for installation of a sealing valve. The lifting rib 2 is provided with a water passing structure through which washing water in the inner drum 1 is guided into the mounting cavity 3.

The drum lifting rib of the drum is arranged as a hollow chamber, so that the lifting rib forms a chamber in which the sealing valve for draining water is installed. In this way, hidden assembly of the sealing valve is achieved, and the function of using the centrifugal force to drain water is implemented for the cleaning-free washing machine. At the same time, the lifting rib extends along the structural lines of the inner drum, so that when the inner drum rotates, the lifting rib blocks the washing water flowing against the wall, the blocked washing water flows into the lifting rib through the water-passing structure provided on the lifting rib to guide the water to be drained outside.

As shown in FIG. 1, in the embodiment, a mounting rib vertically protruding downwards is respectively provided at two opposite side walls of the lower side of the lifting rib body 200, and a lower end of the mounting rib is provided with an installation structure fixed to the side wall of the inner drum 1.

In the embodiment, a first mounting rib 15 and a second mounting rib 16 are respectively provided at left and right sides of the lower side of the lifting rib 2. A lower end of the first mounting rib 15 is provided with a bolt hole 19 for fixed installation relative to a bolt hole formed in the side wall of the inner drum 1. A lower end of the second mounting rib 16 is provided with a positioning pin 18 that is correspondingly in plug-connection to a position hole formed in the side wall of the inner drum 1. Further preferably, two first mounting ribs 15 and two second mounting ribs 16 are distributed at the four end corners of the square lifting rib 2, the two first mounting ribs 15 are arranged symmetrically with respect to the center of the lifting rib 2, and the two second mounting ribs 16 are arranged symmetrically with respect to the center of the lifting rib 2.

The four end corners of the lifting rib are provided with mounting ribs for fixing, so that the four end corners of the lifting rib are respectively fastened and installed, and the assembly of the lifting rib is more reliable. At the same time, the mounting ribs are provided with bolt holes and the positioning pins separately, and the lifting rib is pre-positioned for assembly by the positioning pins and then is fastened by the bolts, so that the assembly speed of the lifting rib is improved.

Figure 4:
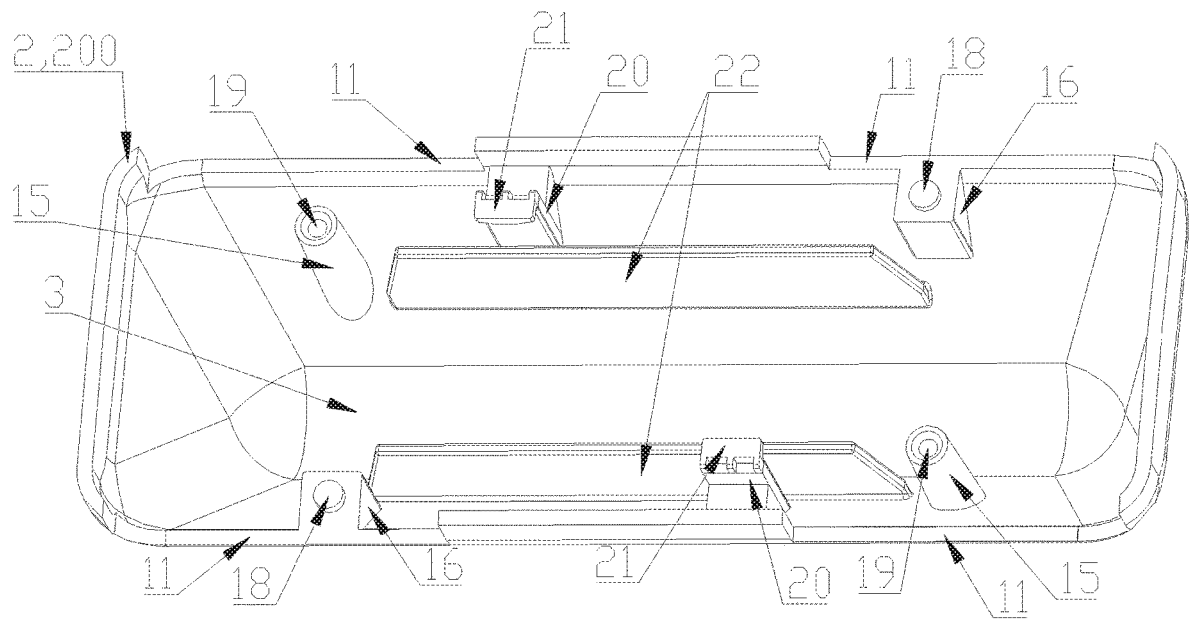
FIG. 4 is a bottom view of a lifting rib according to an embodiment of the present disclosure.

As shown in FIG. 4, in the embodiment, a fixing rib 20 protruding vertically downwards is respectively provided on the opposite two side walls at a lower side surface of the lifting rib 2, a lower end of the fixing rib 20 is provided with a claw 21 horizontally protruding and extending, and the claw 21 is correspondingly clamped and fixed to a clamping hole correspondingly formed in the side wall of the inner drum 1. Preferably, the fixing ribs 20 are arranged close to the center of the corresponding sides of the lifting rib 2. Further preferably, the claw 21 protrudes and extends from the corresponding side of the lifting rib 2 toward the center square of the lifting rib 2.

In the embodiment, the lifting rib body 200 is a conical shape that gradually protrudes upward from the left and right sides to the middle.

Figure 2:
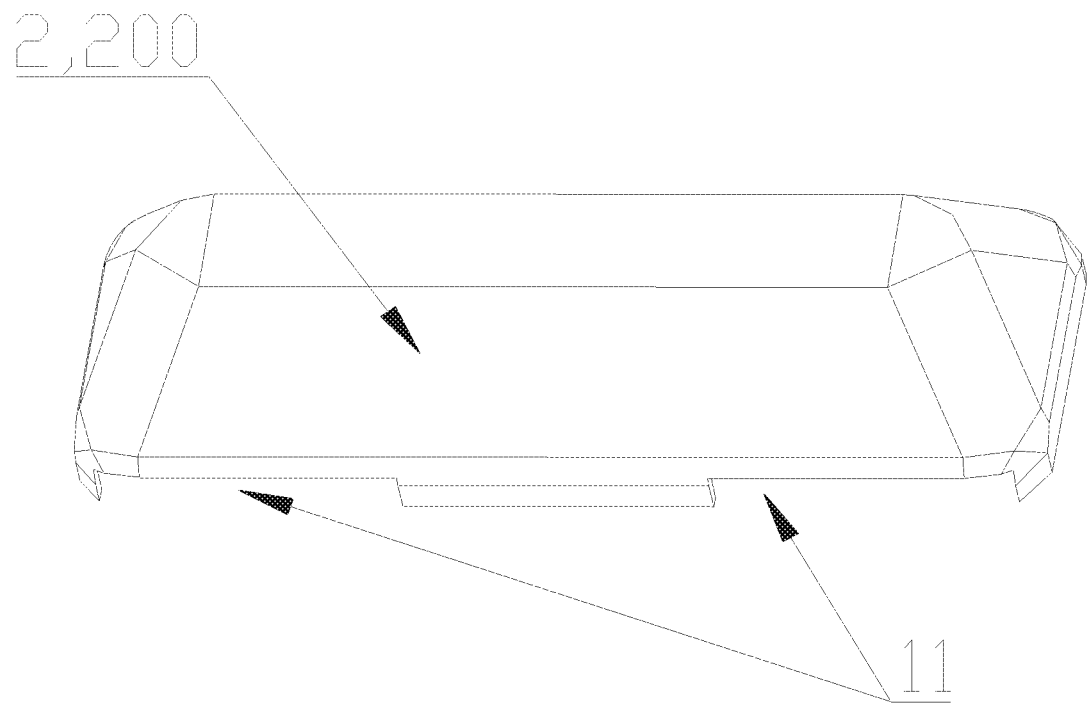
FIG. 2 is a schematic structural diagram of a lifting rib according to an embodiment of the present disclosure.
Figure 3:
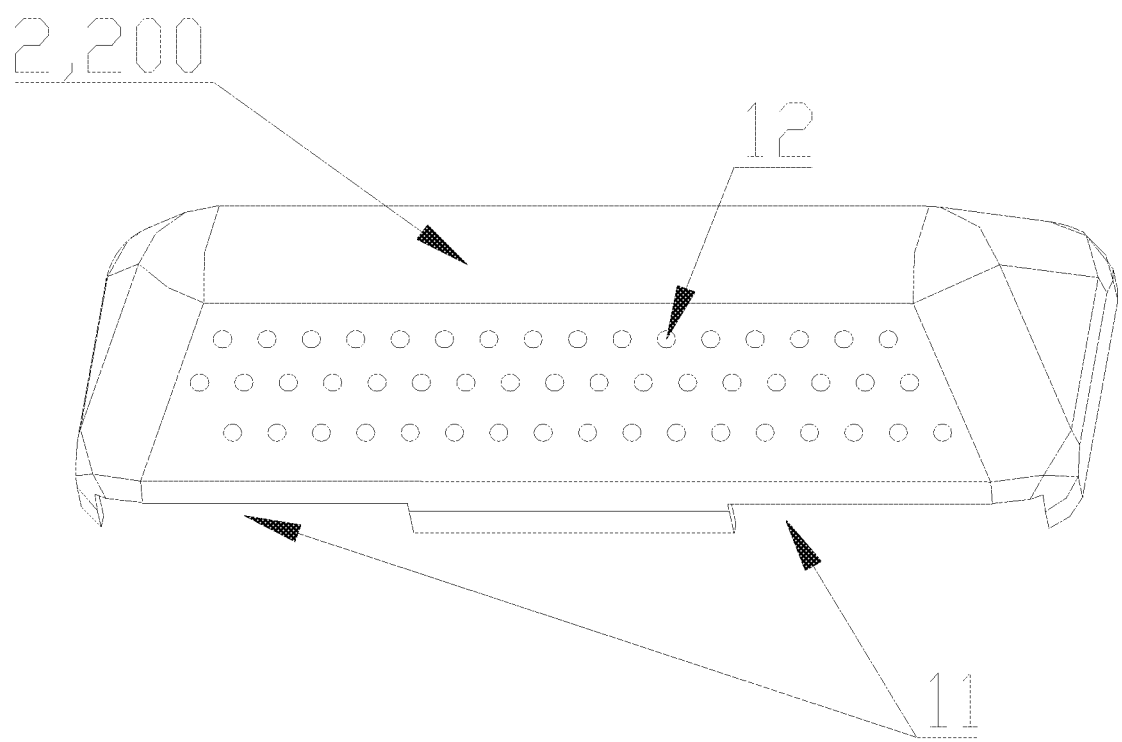
FIG. 3 is a schematic structural diagram of a lifting rib according to another embodiment of the present disclosure.

As shown in FIG. 2 to FIG. 4, in the embodiment, the outer periphery of the lifting rib 2 is of a square shape with arc chamfers at the end corners, the left and right side surfaces of the lifting rib 2 are inclined surfaces that gradually rise from the outer periphery to the center, and the top of the lifting rib 2 is a smooth arc surface that has an arc chamfer and that connects the tops of the two side surfaces. The front and rear ends of the lifting rib 2 are inclined surfaces that gradually incline downward from the end of the smooth arc surface to the outer periphery. The side edges of the inclined surfaces are respectively in sealed connection to the corresponding ends of the side surfaces of the lifting rib 2 by using the arc chamfered surfaces.

An appearance surface of the lifting rib is set to be composed of a plurality of smooth curved surfaces, to reduce the degree of friction between the lifting rib and the clothes, so as to further improve washing efficiency and reduce a washing abrasion rate of the clothes.

In the embodiment, the outer periphery of the lifting rib body 200 is correspondingly in fitted contact with the side wall of the inner drum 1, and there is at least one notch 11 in the outer periphery, so that the washing water in the inner drum 1 flows into the mounting cavity 3 from the notch 11. Preferably, the left and right sides of the square lifting rib 2 are respectively provided with multiple notches 11 formed at intervals. Further preferably, the notches 11 are respectively formed near the two ends on the left and right sides, the first mounting rib 15 and the second mounting rib 16 are respectively arranged in a corresponding section with the notches 11 at the corresponding end corners, and the fixing ribs 20 and the notches are arranged in a staggered manner.

The multiple staggered notches are arranged at the bottom of the lifting rib. On the premise of providing a stable assembly for the lifting rib, after the washing water flowing against the inner drum wall is blocked by the lifting ribs, the washing water flows into the lifting rib through the notches, so that the washing water all drains out through the notches in the bottom of the lifting rib by using the centrifugal force under the high-speed rotation of the inner drum.

In the embodiment, the lower side of the mounting cavity 3 enclosed by the lifting ribs 2 is constituted by the side wall of the inner drum 1. The corresponding area of the side wall of the inner drum 1 is provided with the drain openings 4 communicating with the inside of the mounting cavity 3, and the drain openings 4 are provided with the sealing valves controlled by the centrifugal force to open and close. Preferably, the drain openings 4 are formed in the axis of the lifting rib 2.

In the embodiment, the lower side of the lifting rib 2 is provided with two limiting ribs 22 extending vertically downward and located in the mounting cavity. The two limiting ribs 22 are separated by a certain gap, and the counterweights of the sealing valves move in the gap, so that the gap provides a limiting effect for the movement of the sealing valves. Preferably, the two limiting ribs 22 are arranged symmetrically relative to the axis of the lifting rib 2.

As shown in FIG. 3, in the embodiment, a plurality of water penetration holes 12 are formed in the lifting rib body 200, and each water penetration hole 12 communicates the mounting cavity 3 with the drum outside the lifting rib body 200, to guide the washing water in the inner drum 1 to flow into the lifting rib, so as to further increase the rate at which the washing water in the drum flows into the lifting rib. Preferably, the rear end of the lifting rib 2 is arranged close to the bottom of the inner drum, and there is a certain gap between the rear bottom of the lifting rib 2 and the side wall of the inner drum 1, to guide the washing water in the mounting cavity 3 to flow backwards into the bottom of the inner drum of the inner drum 1.

Embodiment 2

As shown in FIG. 1 to FIG. 7, the embodiment discloses a sealing valve installation structure for the above cleaning-free washing machine. The sealing valve installation structure includes a support plate 9 mounted on the inner side wall of an inner drum 1. A through hole 23 corresponding to drain openings 4 formed in the side wall of the inner drum 1 is provided in the middle of the support plate 9, and a certain gap between the support plate 9 and the side wall of the inner drum 1 is provided to form a space for valve plugs of sealing valves to move up and down. A sleeve-shaped mounting sleeve 6 is fixedly installed on the upper side of the support plate 9. An inner through hole of the mounting sleeve 6 and the through hole 23 formed in the support plate 9 are coaxially and oppositely arranged, so that the valve plugs of the sealing valves are coaxially installed in the inner through hole and can move up and down.

The above installation structure is arranged on the drum, the valve plugs of the sealing valves arranged at the drain openings can be correspondingly assembled in the gap between the support plate and the drum, so that the valve plugs have an upper and lower movement margin in the gap, and it is ensured that the valve plugs correspondingly block or open the drain openings. At the same time, valve plug columns are correspondingly assembled in the mounting sleeves to be limited in the movement direction by the mounting sleeves, thereby avoiding tilting of the valve plug columns. In addition, the mounting sleeves are arranged on the support plate, and supporting points of counterweights of the sealing valves can be correspondingly mounted at the outer peripheries of the mounting sleeves. In this way, prying rotation and installation fixation of the counterweights are ensured.

In the embodiment, the sealing valve installation structure is arranged inside the lifting ribs described in Embodiment 5 above. One or more sealing valves can be installed in the mounting cavity inside the lifting rib, and each sealing valve includes one sealing valve installation structure.

As shown in FIG. 1, in the embodiment, at least one lifting rib 2 is installed on the side wall of the inner drum 1 of the washing machine, and a lifting rib body 200 is of a shell structure whose lower side is open and that is fastened to the inner side wall of the inner drum 1. The rib lifting body 200 is hollow inside to form a mounting cavity 3 for installation of the sealing valve, and the sealing valve installation structure is arranged in the mounting cavity 3.

Figure 5:
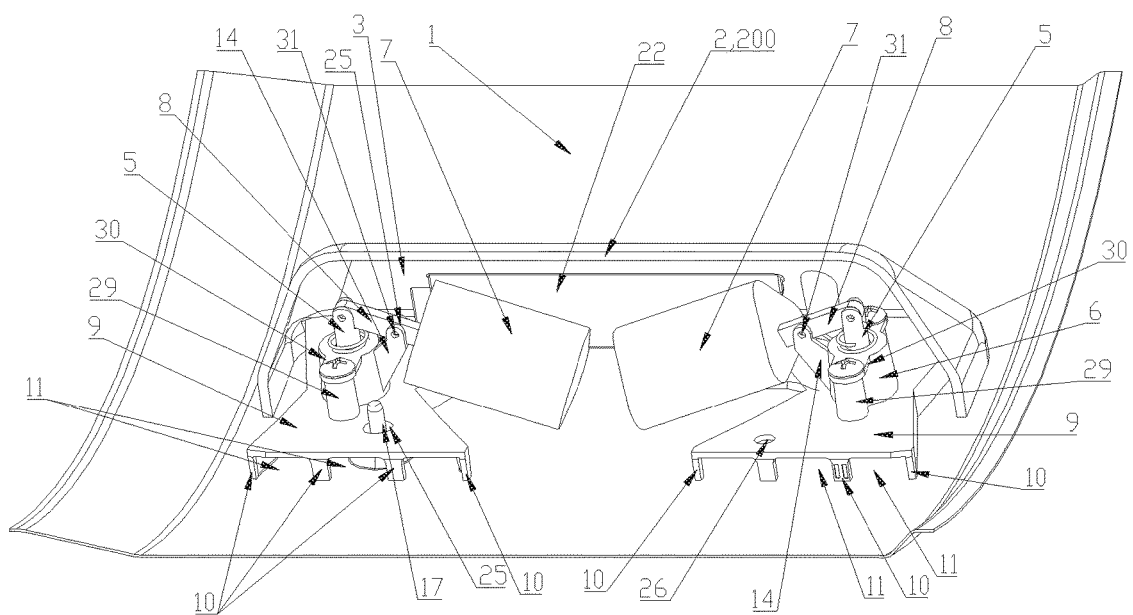
FIG. 5 is a partial sectional view of a lifting rib according to an embodiment of the present disclosure.
Figure 6:
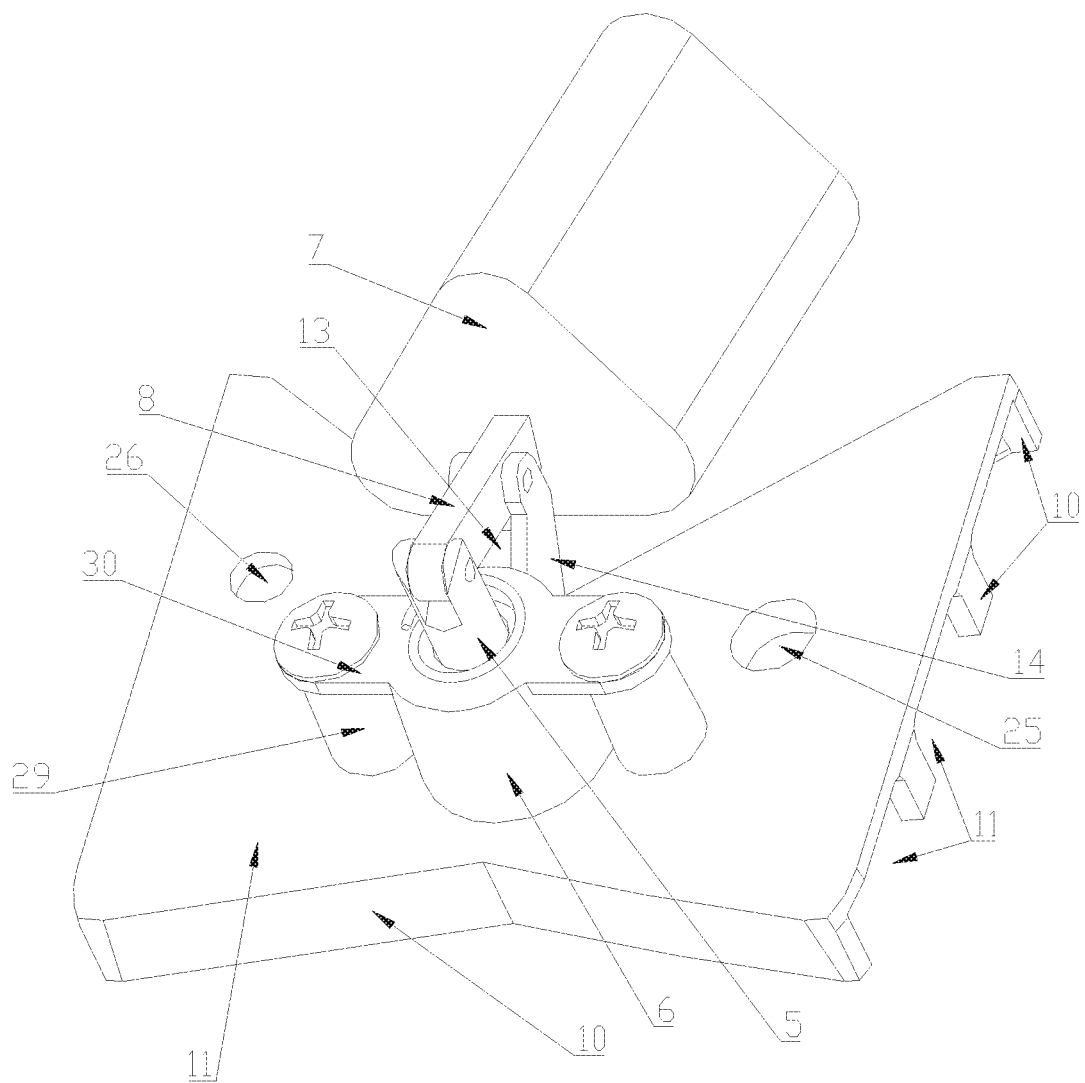
FIG. 6 is an enlarged schematic structural diagram of a sealing valve according to an embodiment of the present disclosure.
Figure 7:
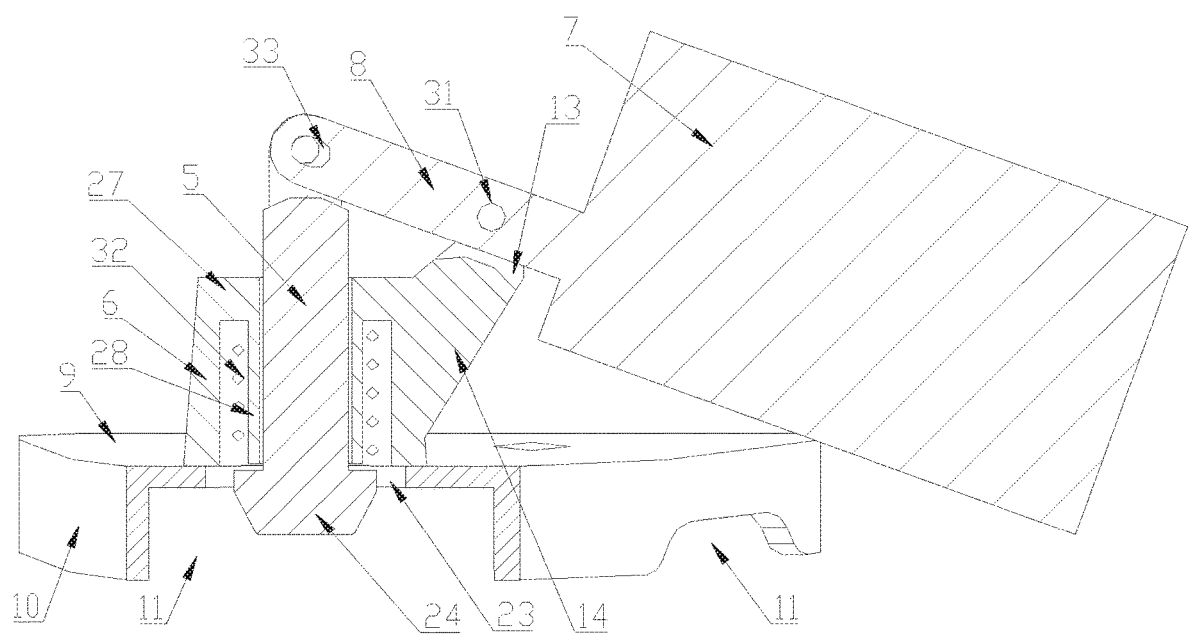
FIG. 7 is a schematic structural diagram of a section of a sealing valve according to an embodiment of the present disclosure.

As shown in FIG. 5 to FIG. 7, in the embodiment, the support plate 9 is a plate that is laid flat on the inner wall of the drum, the lower side of the support plate 9 is provided with multiple support ribs 10 protruding and extending downward, and the lower ends of the supporting ribs 10 are in limit contact with the inner side wall of the inner drum 1. Preferably, the outer periphery of the supporting plate 9 is provided with multiple supporting ribs 10 arranged at intervals. Further preferably, the left and right sides of the supporting plate 9 are provided with multiple supporting ribs 10 arranged at interval, and the front and rear sides of the supporting plate 9 are respectively provided with a whole supporting rib 10 extending along the corresponding side.

In the embodiment, the left and right sides of the lifting rib 2 are respectively provided with notches 11, and the notches 11 are formed corresponding to the sides of the support plate 9, so that the sides of the support plate 9 are clamped in the notches 11 on the corresponding sides.

In the embodiment, the support plate 9 is provided with a downwardly recessed positioning groove 26 and a jack 25 that is arranged in a penetration manner. The jack 25 vertically penetrates through the support plate, and the lower side of the lifting rib 2 is provided with a first mounting rib 15 that protrudes and extends downward and that is coaxially arranged with the jack 25. The lower end of the first mounting rib 15 is provided with a bolt hole 19 coaxially opposite to the jack. A bolt 17 sequentially passes through the inner drum wall and the support plate 9 from the outer wall of the drum upwards, and then is correspondingly screwed and fixed to the bolt hole 19 formed in the first mounting rib 15, so that the support plate 9 and the lifting rib 2 are fixedly installed with the inner drum 1. The positioning groove 26 is formed in the upper side surface of the support plate 9, the lower side of the lifting rib 2 is provided with a second mounting rib 16 protruding and extending downward and coaxially arranged corresponding to the positioning groove 26, and the lower end of the second mounting rib 16 is provided with a positioning pin 18 that is correspondingly in plug-connection to the positioning groove 26.

In the embodiment, the mounting sleeve 6 is of a tube structure vertically extending. The lower end of the mounting sleeve 6 is open, the upper end of the mounting sleeve 6 is provided with a folding edge 27 protruding horizontally inward, and an inner periphery of the folding edge 27 is provided with an inner peripheral folding edge 28 vertically extending downward to the lower end of the mounting sleeve 6. An outer wall of the inner peripheral folding edge 28 and an inner wall of the folding edge 27 are separated by a certain gap, to form a chamber for the installation of a reset spring of the sealing valve. Preferably, the lower end of the mounting sleeve 6 is placed on the upper side of the support plate 9, the mounting sleeve 6 is coaxially arranged with the through hole 23 formed in the support plate 9, an inner peripheral diameter of the lower end of the mounting sleeve 6 is less than or equal to the diameter of the through hole 23, and an outer peripheral diameter of the lower end of the mounting sleeve is greater than the diameter of the through hole 23.

In the embodiment, the upper side of the support plate 9 is provided with a mounting rib 29 protruding and extending upward, and the upper end of the sealing sleeve 6 is provided with extending ribs 30 horizontally protruding and extending outward. The extending end of the extending rib 30 and the upper end of the mounting rib 29 is correspondingly overlapped and fitted, and overlapping parts are fixed and connected by the bolts, so that the support plate 9 and the mounting sleeves 6 are fastened to be installed by the bolts. Preferably, mounting ribs 29 respectively arranged on the left and right sides of the through hole 23 are arranged on the upper side of the support plate 9, and the extending ribs 30 horizontally protruding and extending outward are respectively provided on the left and right sides of the mounting sleeve 6, so that the two extending ribs 30 and the mounting ribs 29 on the corresponding sides respectively overlap and are fixed to be installed by the bolts.

In the embodiment, one side of the mounting sleeve 6 is provided with a second extending rib 14 that horizontally protrudes and extends outward, and the extending end of the second extending rib 14 is provided with a hinge hole 31 having a horizontal axis, to implement hinged installation of the counterweight of the sealing valve. Preferably, an included angle between the second extending rib 14 and the extending direction of the extending rib 30 is 90 degrees, and the axis of the hinge hole 31 is parallel to the extending direction of the extending rib 30. Further preferably, the extending end of the second extending rib 14 is higher than the top of the mounting sleeve 6, and the extending end of the second extending rib 14 is provided with a slot 13, the slot 13 is formed along the extending direction of the second extending rib 14, to implement corresponding plug-connection to the counterweight of each sealing valve. The slot 13 is provided with a horizontally extending hinge hole 31.

In the embodiment, the mounting cavity 3 enclosed by the lifting rib 2 is provided with two oppositely arranged sealing valve mounting structures, and the second extending ribs 14 of the two sealing valve mounting structures oppositely extend in an approaching direction.

Embodiment 3

As shown in FIG. 1 to FIG. 7, the embodiment discloses a sealing valve plug structure for the above cleaning-free washing machine. The sealing valve plug structure includes a valve plug column 5 corresponding to the drain opening formed in the side wall of the inner drum 1, and a counterweight 7 hinged to the upper end of the valve plug column 5. A sealing valve installation structure is fixedly installed on the side wall of the inner drum 1, and the reset spring 32 is clamped between the sealing valve installation structure and the valve plug column 5.

The valve plug structure mentioned above is installed on the inner drum, the counterweight can be used to generate an action, under the action of centrifugal force, to correspondingly open the drain opening, and the valve plug column can further be reset by the reset spring to make the valve plug correspondingly block the drain opening. In this way, the centrifugal force under the high-speed rotation of the drum is used to act on the valve plug column to correspondingly open and close the drain opening.

The sealing valve plug structure in the embodiment is installed on the sealing valve installation structure in the above Embodiment 6, or the valve plug of a sealing valve can further be fixedly installed on the inner drum of the washing machine by using the above sealing valve installation structure. In particular, the sealing valve plug structure in the embodiment can further be installed in the lifting ribs described in Embodiment 5 by using the sealing valve installation structure described in Embodiment 6. The above mounting structure extending to the hollow part of the lifting rib is arranged on the side wall of the inner drum, so that a support rod is installed on the top of a mounting seat at a certain height from the side wall of the drum, and there can be a certain height difference between the end of the support rod and the side wall of the inner drum. In this way, the counterweight move downward to provide displacement space for moving the valve plug.

As shown in FIG. 5 to FIG. 7, in the embodiment, the valve plug column 5 is coaxially arranged at the drain opening 4, and the lower end of the valve plug column 5 is provided with a valve plug 24 protruding outwards in the radial direction. Preferably, the valve plug 24 is a plug and a diameter of the valve plug increases from bottom to top. The radial width of a large end of the valve plug 24 is larger than the diameter of the drain opening 4, and the radial width of a small end is smaller than the diameter of the drain opening 4.

In the embodiment, the sealing valve installation structure includes a support plate 9 installed on the inner side wall of the inner drum 1, a through hole 23 corresponding to the drain openings 4 formed in the side wall of the inner drum 1 is formed in the middle of the support plate 9. There is a certain gap between the support plate 9 and the side wall of the inner drum 1, to form a space for the valve plug of the sealing valve to move up and down. The upper side of the support plate 9 is fixedly provided with a sleeve-shaped mounting sleeve 6, and an inner through hole of the mounting sleeve 6 and the through hole 23 formed in the support plate 9 are coaxially and oppositely arranged, so that the valve plug column 5 of the sealing valve is coaxially arranged in the inner through hole and can move up and down.

In the embodiment, the mounting sleeve 6 is of a tube structure vertically extending. The lower end of the mounting sleeve 6 is open, the upper end of the mounting sleeve 6 is provided with folding edge 27 protruding horizontally inward, and the inner periphery of the folding edge 27 is provided with inner peripheral folding edge 28 vertically extending downward to the lower end of the mounting sleeve. The outer wall of the inner peripheral folding edge 28 and the inner wall of the folding edges 27 are separated by a certain gap, to form a chamber for installation of the reset spring 32 of the sealing valve. Preferably, the outer wall of the inner peripheral folding edge 28 is sleeved with the reset spring 32, the upper end of the reset spring 32 collide with the lower side of the folding edge 27, and the lower end of the reset spring 32 collide with the large end of the valve plug 24. Further preferably, the outer wall of the valve plug column 5 collide with the inner wall of the inner peripheral folding edge 28 in a limiting manner.

In the embodiment, one side of each mounting sleeve 6 is provided with a second extending rib 14 horizontally protruding and extending outward, and the extending end of the second extending rib 14 is provided with a hinge hole 31 having a horizontal axis. The counterweight of the sealing valve 7 and the second extending ribs 14 are mounted via a pin passing through the hinge hole 31.

In the embodiment, the upper end of the counterweight 7 are provided with a connecting rib 8 protruding and extending upward in the axial direction. The upper end of the valve plug column 5 passes through the top of the mounting sleeve 6, and the end of the connecting rib 8 is connected to the upper end of valve plug column 5 in a hinging manner. The middle part of the connecting rib 8 is overlapped and connected with the second extending rib 14 of the mounting sleeve 6 via a penetrated pin through the overlap part in a hinging manner. Preferably, the extending end of the second extending rib 14 is higher than the top of the mounting sleeve 6, the extending end of the second extending rib 14 is provided with a slot 13, the slot 13 is arranged along the extending direction of the second extending rib 14, and the middle part of the connecting rib 8 of the sealing valve is correspondingly inserted into the slot 13. The slot 13 is provided with the hinge hole 31 extending horizontally, and the middle part of the connecting rib 8 is provided with the corresponding overlapping hinge hole, so as to implement hinged installation at the overlapping portion via the penetrated pin.

In the embodiment, the end of each connecting rib 8 is provided with a rotating hole hinged to the upper end of the corresponding valve plug column 5. The rotating hole is a long-strip-shaped through hole 33 extending along the axial direction of the corresponding connecting rib 8, to provide a space for the connecting rib 8 to drive the valve plug column 5 to move up and down when the counterweight 7 rotates around the mounting sleeve 6.

In the embodiment, the outer periphery diameter of the upper end of the valve plug 24 is greater than the diameter of the lower end of the inner peripheral folding edge, and the height of the valve plug 24 is less than the height of the gap between the support plate and the side wall of the drum.

In the embodiment, the mounting cavity 3 enclosed by the lifting rib 2 is provided with two oppositely arranged sealing valves, the two sealing valves are arranged along the direction of the structural line of the drum, and the counterweights 7 of the two sealing valve plug structures oppositely extend towards an approaching direction.

In the embodiment, when the washing machine is in the dehydration and/or drainage state, the inner drum is in a high-speed rotation state, and the water in the inner drum flows against the inner wall under the action of centrifugal force, and flows into the lifting rib from the gap between the inner drum wall and the lifting rib. In this case, the counterweights move toward the outer periphery of the inner drum under the action of centrifugal force, the counterweights provide an upward prying force for the valve plug columns to the center of the inner drum via the connecting ribs, and the valve plug overcomes the elastic force of the reset springs under the centrifugal force of the counterweights, so that the valve plug columns displace in the radial direction in the inner drum to open the drain openings. When the washing machine is in a non-dewatering and non-draining state, the drum is not in a high-speed rotation state, the counterweights are no longer affected by the centrifugal force, and the reset springs are in a pulling state, the reset springs exert a pushing force on the valve plug columns toward the outer periphery of the inner drum, so that the valve plugs move to the initial position until the drain openings are closed, and when the inner drum is in the washing or rinsing process, the reset springs always provide an elastic force for the valve plug columns to ensure that the valve plugs always block the drain openings, so as to ensure that the drain openings are always in a closed state.

The above descriptions are only the preferred embodiments of the present disclosure, and are not intended to limit the present disclosure in any form. The preferred embodiments are disclosed in the present disclosure, but are not intended to limit the present disclosure. Any person of skills familiar with this patent can use, without departing from the scope of the technical solution of the present disclosure, the technical content suggested above to make slight changes or modifications as equivalent embodiments with equivalent changes. Any modification, equivalent changes, or improvement made on the above embodiments based on the contents of the technical essence of the present disclosure without departing from the content of the technical solutions of the present disclosure shall fall within the protection scope of the present disclosure.

The invention claimed is:

1. A sealing valve installation structure, comprising:
   a support plate being mounted on a side wall of an inner drum of a washing machine, wherein
   a through hole corresponding to a drain opening formed in the side wall of the inner drum is provided in a middle of the support plate, and a gap between the support plate and the side wall of the inner drum is provided to form a space for a valve plug of a sealing valve to move up and down;
   a mounting sleeve is fixedly installed on an upper side of the support plate, an inner through hole of the mounting sleeve and the through hole in the support plate are coaxially and oppositely arranged, so that the valve plug of the sealing valve is coaxially installed in the inner through hole and is movable up and down; and
   a lifting rib configured to be installed on the side wall of the inner drum, and a lifting rib body is of a shell structure, and a lower side of the shell structure is open and is fastened to the side wall of the inner drum,
   the lifting rib body is hollow inside to form a mounting cavity for installation of the sealing valve,
   the support plate is provided with a positioning groove recessed downwardly and a jack vertically penetrates through the support plate, and a lower side of the lifting rib is provided with a first mounting rib protruding downwardly, and the first mounting rib is coaxially arranged with the jack, a lower end of the first mounting rib is provided with a bolt hole coaxially corresponding to the jack, a first bolt sequentially passes through the side wall of the inner drum, the support plate and then is correspondingly screwed and fixed to the bolt hole formed in the first mounting rib from an outer wall of the inner drum, so that the support plate and the lifting rib are fixedly installed with the inner drum;

the positioning groove is formed in an upper side surface of the support plate, the lower side of the lifting rib is provided with a second mounting rib protruding downwardly and the second mounting rib is coaxially arranged corresponding to the positioning groove, and a lower end of the second mounting rib is provided with a positioning pin that is configured to connect to the positioning groove.

2. The sealing valve installation structure according to claim 1, wherein the support plate is laid flat on the side wall of the inner drum, support ribs protruding downward are provided at a lower side of the support plate, and lower ends of the support ribs are in contact with the side wall of the inner drum.

3. The sealing valve installation structure according to claim 2, wherein, left and right sides of the lifting rib are respectively provided with a notch, and each notch is formed corresponding to a side of the support plate, so that the sides of the support plate are clamped in the notches.

4. The sealing valve installation structure according to claim 1, wherein, the mounting sleeve is of a tube structure extending vertically, a lower end of the mounting sleeve is open, an upper end of the mounting sleeve is provided with a folding edge protruding horizontally inward, and an inner periphery of the folding edge is provided with an inner peripheral folding edge extending vertically downward to the lower end of the mounting sleeve;

an outer wall of the inner peripheral folding edge and an inner wall of the mounting sleeve are separated by a gap, to form a chamber for installation of a reset spring of the sealing valve.

5. The sealing valve installation structure according to claim 4, wherein, the upper side of the support plate is provided with a mounting rib protruding and extending upward, and an upper end of the sealing sleeve is provided with a first extending rib protruding and extending horizontally outward, an extending end of the first extending rib and an upper end of the mounting rib are correspondingly overlapped and fixedly connected by a second bolt at an overlapping position, so that the support plate and the mounting sleeve are fastened to be installed by the second bolt.

6. The sealing valve installation structure according to claim 4, wherein, a side of the mounting sleeve is provided with a second extending rib protruding and extending horizontally outward, and an extending end of the second extending rib is provided with a hinge hole with a horizontal axis, the hinge hole is configured to implement a hinged installation of a counterweight of the sealing valve.

7. The sealing valve installation structure according to claim 6, wherein, the mounting cavity enclosed by the lifting rib is provided with two sealing valve mounting structures correspondingly arranged, each sealing valve mounting structure including a respective second extending rib that extends in an approaching direction.

8. A cleaning-free washing machine comprising:
the sealing valve installation structure according to claim 1; wherein
the inner drum being a sealed container after a drum opening is covered by a door cover,
the drain opening, communicated to a hollow part of the lifting rib and formed in the side wall of the inner drum,
the sealing valve, arranged at the drain opening,
wherein the sealing valve is installed on the inner drum via the sealing valve installation structure,
when the inner drum rotates at a high speed, the valve plug of the sealing valve moves along a radial direction towards a center of the inner drum under an action of a counterweight to open the drain opening formed in the side wall of the inner drum.

9. The sealing valve installation structure according to claim 2, wherein an outer periphery of the support plate is provided with the support ribs arranged at intervals.

10. The sealing valve installation structure according to claim 2, wherein left and right sides of the support plate are provided with the support ribs arranged at intervals, and front and rear sides of the support plate are respectively provided with one supporting rib extending along a corresponding side.

11. The sealing valve installation structure according to claim 1, wherein the support plate is laid flat on the side wall of the inner drum, support ribs protruding downward are provided at a lower side of the support plate, and lower ends of the support ribs are in contact with the side wall of the inner drum.

12. The sealing valve installation structure according to claim 4, wherein, the lower end of the mounting sleeve is placed on the upper side of the support plate, the mounting sleeve is coaxially arranged with the through hole in the support plate, an inner peripheral diameter of the lower end of the mounting sleeve is less than or equal to a diameter of the through hole in the support plate, and an outer peripheral diameter of the lower end of the mounting sleeve is greater than the diameter of the through hole in the support plate.

13. The sealing valve installation structure according to claim 5, wherein, one mounting rib is arranged on each of the left and right sides of the through hole of the support plate, on the upper side of the support plate, and
each of the left and right sides of the mounting sleeve is provided with the first extending rib protruding and extending horizontally outward, so that the first extending rib and the mounting rib on a corresponding side are overlapped and fixedly installed by respective second bolts.

14. The sealing valve installation structure according to claim 6, wherein, an included angle between the second extending rib and an extending direction of a first extending rib is 90 degrees, and the horizontal axis of the hinge hole is parallel to the extending direction of the first extending rib.

15. The sealing valve installation structure according to claim 6, wherein, the extending end of the second extending rib is higher than a top of the mounting sleeve, and the extending end of the second extending rib is provided with a slot, the slot is formed along an extending direction of the second extending rib to connect with the counterweight of the sealing valve, and the slot is provided with the hinge hole extending horizontally.

* * * * *